June 18, 1940. E. T. STRATTON 2,205,316
BATTERY TESTER
Filed July 10, 1939
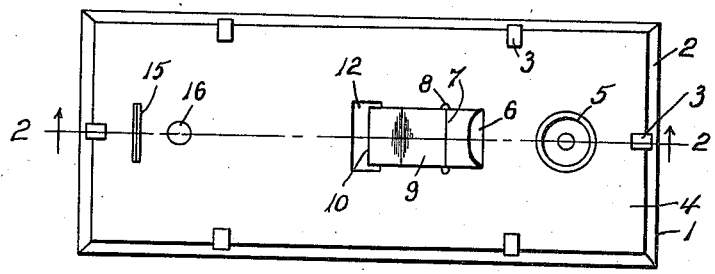
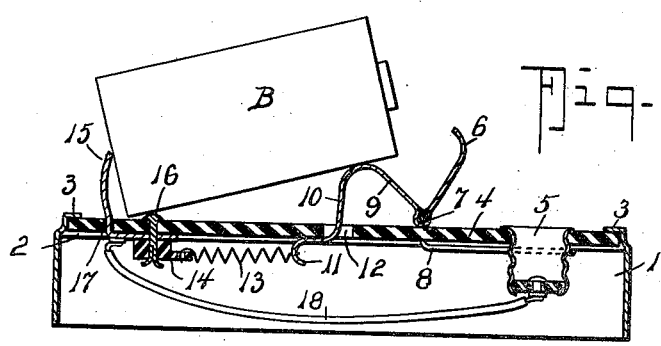
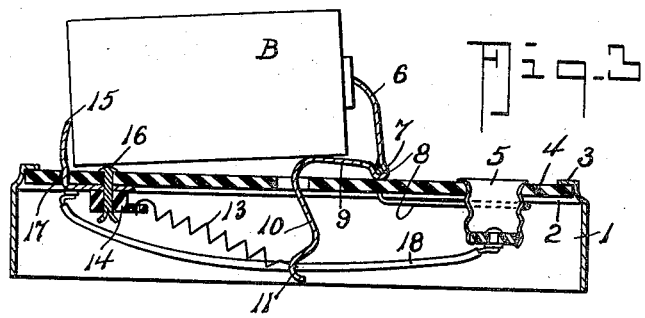
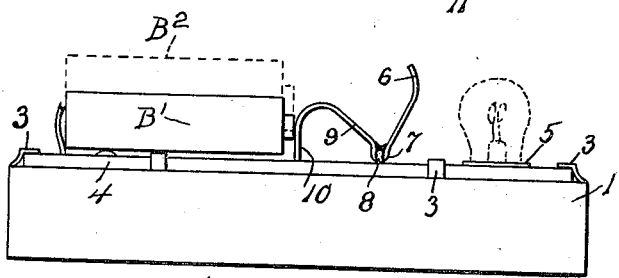
Inventor
Edwin T. Stratton
By Dieterich & Rutley
Attorneys Patented June 18, 1940

2,205,316

UNITED STATES PATENT OFFICE 2,205,316

BATTERY TESTER

Edwin T. Stratton, Memphis, Tenn.

Application July 10, 1939, Serial No. 283,706

5 Claims. (Cl. 175—183)

My invention relates to battery testers of the type disclosed in my Patent No. 2,155,778, issued April 25, 1939, and it particularly has for its object to provide a simple, inexpensive device of a more compact form than the others and one that can be manufactured at less cost.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a top plan view of the tester.

Fig. 2 is a vertical section on the line 2—2 of Fig. 1, a large battery being placed, but not pressed down to make contact.

Fig. 3 is a similar view with the battery pressed down for contact.

Fig. 4 is a side elevation of the device showing how it may be used to test short batteries, especially those for pencil-type lighters.

In the drawing, 1 is a suitable support which carries a base 4 of insulation. The support 1 may have a flange 2 on which the base is held by bent tongue 3. Mounted in the base 4 is a socket 5 to receive a lamp bulb (see Fig. 4).

There is also, pivotally mounted on the base 4, a rocking member composed of a contact finger 6, a bearing loop 8, a battery-engaging portion 9 and an arm portion 10, the latter passing through a slot 12 in the base and having an end 11 to which one end of a suitable spring 13 is hooked, the spring also being hooked to an insulator 14.

15 is a stationary contact finger, preferably somewhat resilient, which is secured to the base by a rivet 16 which also holds the insulator 14.

The finger 15 projects upwardly through a second opening 17 in the base 2 and is so bent as to be engaged by the bottom electrode of the battery cell B when the cell is placed in position (Figs. 2, 3).

The loop portion 7 of the rocking member is pivoted on a bridge-bearing loop 8 which passes through the base 4 and is electrically connected to the socket 5 by solder or other desirable means. The contact finger 15 is also wired at 18 to the center contact of the socket 5. In use, the battery cell B (large size) is placed, as shown in Fig. 2, and pushed down to rock finger 6 into contact with the center electrode of the cell while the bottom electrode is engaged by the finger 15 to complete the circuit.

Shorter cells $B^1$—$B^2$ are tested as shown in Fig. 4.

The larger cells, when pressure down on them is released, will be raised again to the position of Fig. 2 by the action of the spring 13 on arm 10, which causes arm portion 9 to rise and the finger 6 to recede from the cell end and thus open the circuit, it being understood that the cell is covered by an insulating band as usual.

Since lever arm 9—10 tends to be swung down when the electrode of the smaller cell is pushed down into contact with it, the spring 13 also tends to eject the smaller cells, or at least lift them, when pressure is released, enough to break the contact between the electrode and the arm portion 10.

From the foregoing description, taken in connection with the accompanying drawing, it is thought that the construction and advantages of the invention will be clear to those skilled in the art to which it relates.

What I claim is:

1. In a flash-light battery tester, a base, a light bulb socket on said base, a pair of spaced-apart contact members for engaging the electrical terminals of a battery-to-be-tested, electric circuit connections between each of said contact members and said socket, one of said contact members being pivotally mounted and provided with an offset to be engaged by the side of a battery when the battery is being placed in position for testing to swing said pivoted contact member into engagement with the adjacent battery terminal, and means continuously tending to move said pivoted contact member out of contact with said terminal.

2. In a flash-light battery tester, a base, a contact member fixedly mounted on the base, said base having an opening, a second contact member pivotally mounted on the base and having a portion projecting through said opening, means continuously tending to hold said second contact member in an inoperative position, said second contact member having a portion to be engaged by the side of a battery when the battery is placed in position for testing to swing said second contact member into operative contact with the adjacent battery terminal, a light bulb socket, and electric circuit connections between said socket and the respective contact members.

3. In a flash-light battery tester, a base, a light bulb socket on said base, a pair of spaced-apart contact members for engaging the electrical terminals of a battery-to-be-tested, electric circuit connections between each of said contact members and said socket, one of said contact members being pivotally mounted and provided with an offset to be engaged by the side of a battery when the battery is being placed in position for testing to swing said pivoted contact member into engagement with the adjacent battery terminal, and means continuously tending to move said pivoted contact member out of contact with said terminal, said offset contact member including a portion projecting through a slot in said base, said projecting portion being spaced from said fixed contact member a distance less than the over-all length of a smaller battery whereby said smaller battery may be tested by contact with said fixed contact and with said projecting portion.

4. In a flash-light battery tester, a base, a contact member fixedly mounted on the base, said base having an opening, a second contact member pivotally mounted on the base and having a portion projecting through said opening, means continuously tending to hold said second contact member in an inoperative position, said second contact member having a portion to be engaged by the side of a battery when the battery is placed in position for testing to swing said second contact member into operative contact with the adjacent battery terminal, a light bulb socket, and electric circuit connections between said socket and the respective contact members, said offset contact member including a portion projecting through a slot in said base, said projecting portion being spaced from said fixed contact member a distance less than the over-all length of a smaller battery whereby said smaller battery may be tested by contact with said fixed contact and with said projecting portion.

5. In a flash-light battery tester, a base, a contact member fixedly mounted on the base, said base having an opening, a second contact member comprising a contact finger, a pivoted portion, and a portion extending from the pivoted portion to the fixed contact member and at an angle to said finger, said second contact member also including a second portion extending at an angle to said first mentioned portion and projecting through said base opening, means cooperating with said pivoted portion to mount said second contact member on said base, yieldable means continuously tending to raise said projecting portions of said second contact member and rock said second contact member in one direction on its pivot, said projecting portions being so spaced from said fixed contact member as to be engageable by a battery for circuit closing purposes, a lamp bulb socket mounted on the base, and electrical connections between said socket and the respective contact members.

EDWIN T. STRATTON.